(12) United States Patent
Asher

(10) Patent No.: US 8,806,439 B1
(45) Date of Patent: Aug. 12, 2014

(54) SYSTEM AND METHOD FOR PROGRAM STACK SECURITY

(75) Inventor: Michael L. Asher, Green Cove Springs, FL (US)

(73) Assignee: AT & T Intellectual Property II, LP, Atlanta, GA (US)

( * ) Notice: Subject to any disclaimer, the term of this patent is extended or adjusted under 35 U.S.C. 154(b) by 1590 days.

(21) Appl. No.: 11/742,056

(22) Filed: Apr. 30, 2007

(51) Int. Cl.
*G06F 9/44* (2006.01)

(52) U.S. Cl.
USPC ............................ 717/126; 717/127; 711/212

(58) Field of Classification Search
USPC ........... 717/124–133; 711/112, 132; 712/220, 712/240, 243
See application file for complete search history.

(56) References Cited

U.S. PATENT DOCUMENTS

| | | | | |
|---|---|---|---|---|
| 4,080,599 | A * | 3/1978 | Conti | 342/195 |
| 5,603,030 | A * | 2/1997 | Gray et al. | 717/151 |
| 6,301,699 | B1 * | 10/2001 | Hollander et al. | 717/131 |
| 6,457,174 | B1 * | 9/2002 | Kuroda et al. | 717/162 |
| 6,578,094 | B1 * | 6/2003 | Moudgill | 710/57 |
| 6,684,329 | B1 * | 1/2004 | Epstein et al. | 713/150 |
| 6,941,473 | B2 | 9/2005 | Etoh et al. | |
| 6,996,677 | B2 * | 2/2006 | Lee et al. | 711/132 |
| 7,086,088 | B2 | 8/2006 | Narayanan | |
| 7,210,134 | B1 * | 4/2007 | Langer | 717/140 |
| 7,350,040 | B2 * | 3/2008 | Marinescu | 711/156 |
| 2004/0255146 | A1 * | 12/2004 | Asher et al. | 713/200 |
| 2007/0220504 | A1 * | 9/2007 | Eker | 717/168 |
| 2007/0234297 | A1 * | 10/2007 | Zorn et al. | 717/124 |
| 2008/0005528 | A1 * | 1/2008 | Morris | 711/207 |

OTHER PUBLICATIONS

Tuck, N.; Calder, B.; Varghese, G.; , "Hardware and Binary Modification Support for Code Pointer Protection From Buffer Overflow," Microarchitecture, 2004. MICRO-37 2004. 37th International Symposium on , vol., No., pp. 209-220, Dec. 4-8, 2004 doi: 10.1109/MICRO.2004.20 URL: http://ieeexplore.ieee.org/stamp/stamp.jsp?tp=&arnumber=1550995&isnumber.*

McGregor, J.P.; Karig, D.K.; Shi, Z.; Lee, R.B.; , "A processor architecture defense against buffer overflow attacks," Information Technology: Research and Education, 2003. Proceedings. ITRE2003. International Conference on , vol., No., pp. 243-250, Aug. 11-13, 2003 doi: 10.1109/ITRE.2003.1270612; URL:http://ieeexplore.ieee.org/stamp/stamp.jsp?tp=arnumber=1270612&isnumber=28360.*

Corliss et al., ACM SIGARCH Computer Architecture News—Special issue: Workshop on architectural support for security and anti-virus (WASSA); vol. 33 Issue 1, Mar. 2005; ACM; pp. 65-72.*

* cited by examiner

*Primary Examiner* — Satish Rampuria
(74) *Attorney, Agent, or Firm* — Fay Kaplun & Marcin, LLP

(57) ABSTRACT

A system having a processor receiving a copy of a program and modifying the copy to create a modified program and a memory including a memory stack, the modified program being stored in the memory stack, wherein a first image of the memory stack storing the modified program is different from a second image of the memory stack storing the copy of the program.

14 Claims, 4 Drawing Sheets

Memory Space 5

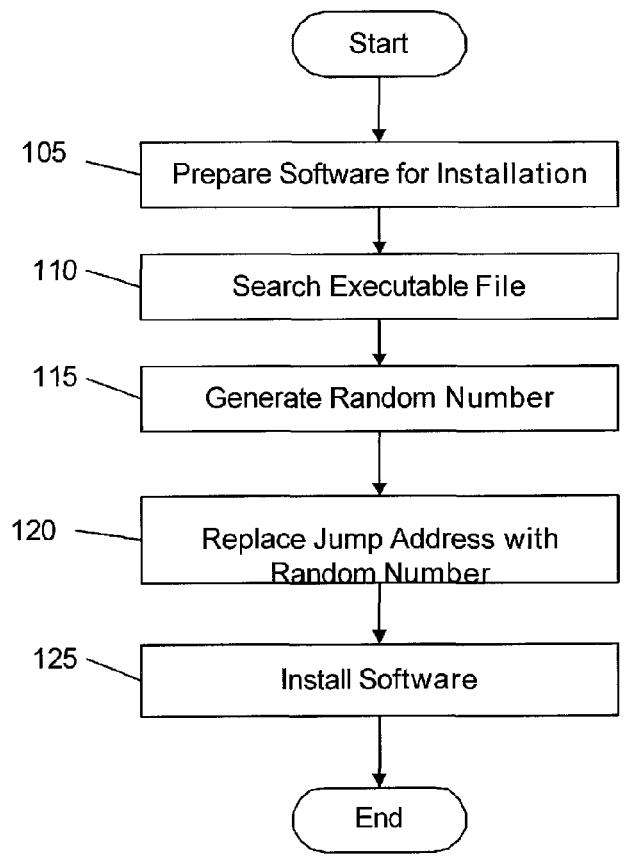

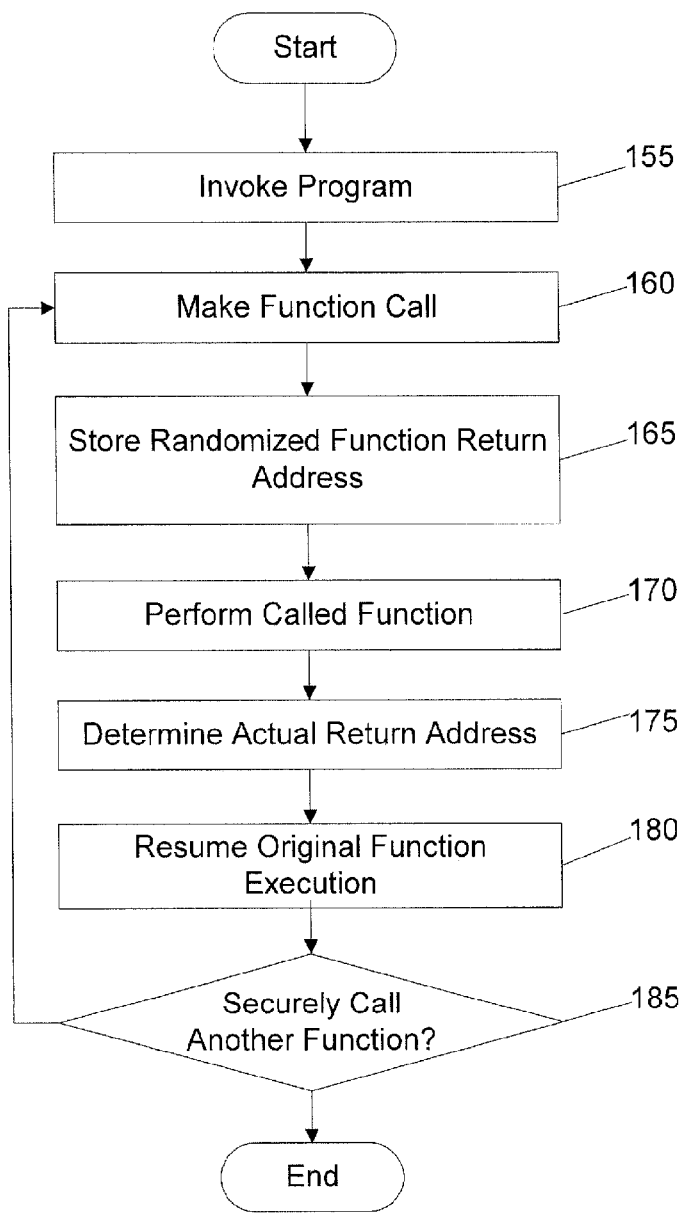

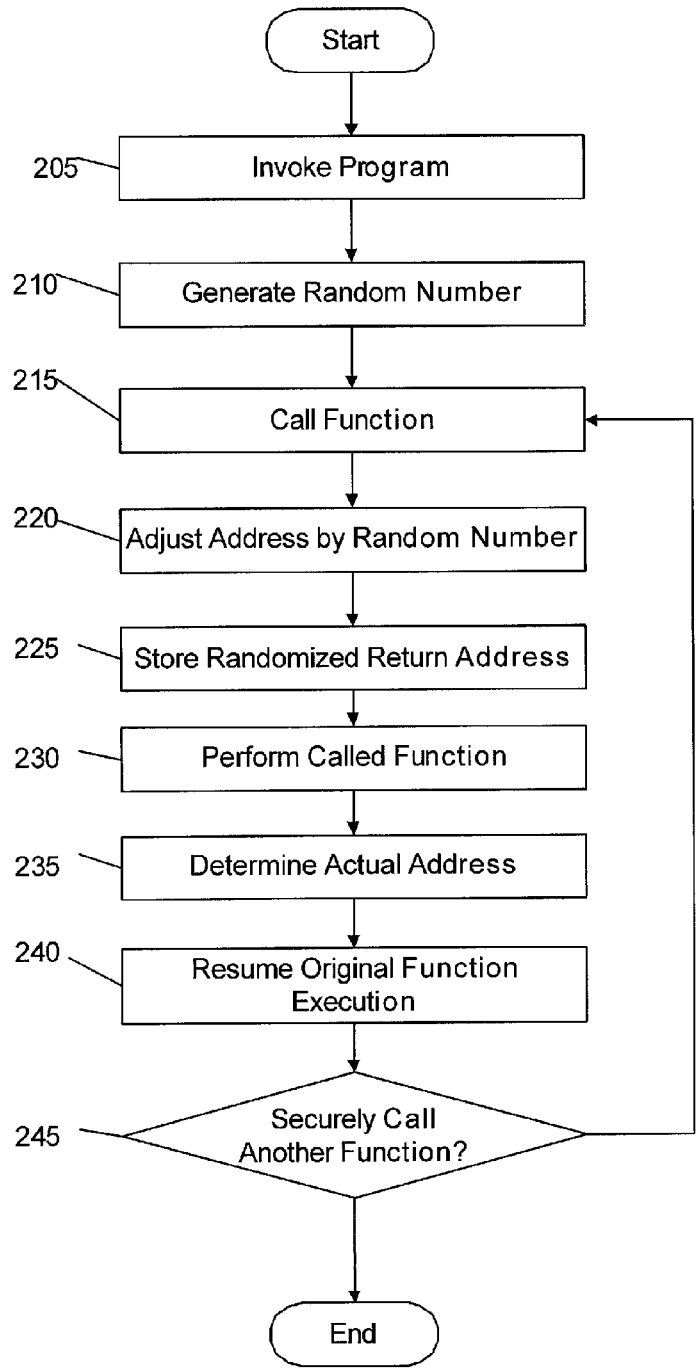

SYSTEM AND METHOD FOR PROGRAM STACK SECURITY

BACKGROUND INFORMATION

Computer systems are often the target of attacks in the form of viruses, worms, and other forms of hacker attacks. Recovery from such attacks can be costly and time-consuming, and occasionally important or valuable data may be permanently lost. It is therefore desirable to constantly improve security measures taken to prevent such attacks.

One of the most common types of hacker attacks is the "buffer overrun attack" (used by both the 2002 'Code Red' and the 2003 'SQL Slammer' worms). This is a technique in which an attacker feeds an overly large text string or array into a vulnerable system. The system fails to check the size of the input, and copies it into a "buffer" (a defined space in memory) too small to hold it. The extra data spills over one end, overwriting other memory variables or flow control pointers on the process "stack." In some cases, this overflow may simply cause the running program to crash or malfunction in a random fashion. However, in more sophisticated attacks, the attacker can carefully construct the input data, so that the overflow portion is not random, but rather consists of specific values chosen to force the process to perform actions of the attacker's choosing. Such actions may include, for example, formatting a disk or granting admin rights. In order to plan and execute such an attack, the attacker relies on a "mirror stack," an installed image of the program installed on the attacker's system that is identical to those installed on other computer systems.

Existing methods to protect against such attacks exist, but all either impose a severe performance penalty on a system, are vulnerable to attack themselves, or both. Further, some require the original source code of a software system to be partially rewritten or translated into another language, which can be prohibitively costly. Therefore, it is desirable to improve on existing methods for protecting against buffer overrun attacks.

SUMMARY OF THE INVENTION

A system having a processor receiving a copy of a program and modifying the copy to create a modified program and a memory including a memory stack, the modified program being stored in the memory stack, wherein a first image of the memory stack storing the modified program is different from a second image of the memory stack storing the copy of the program.

A method for receiving a function return address for a program, creating a randomized function return address by modifying the function return address with a random number and storing the randomized function return address in a memory stack.

A method for searching an executable program file for occurrences of a jump address, replacing each occurrence of jump addresses with a random number to create a randomized jump address in a modified executable file and storing the modified executable program file.

A system having a memory including a stack portion and a processor executing a program, wherein, when the processor makes a function call within the program, the processor stores a randomized function return address in the stack portion of the memory.

DESCRIPTION OF THE DRAWINGS

FIG. 2 shows an exemplary method of installing software wherein a random value is generated during program installation according to the present invention.

FIG. 3 shows an exemplary method of altering a function return addresses to prevent memory stack attacks according to the present invention.

FIG. 4 shows a second exemplary method of altering a function return addresses to prevent memory stack attacks according to the present invention.

DETAILED DESCRIPTION

Figure 1:
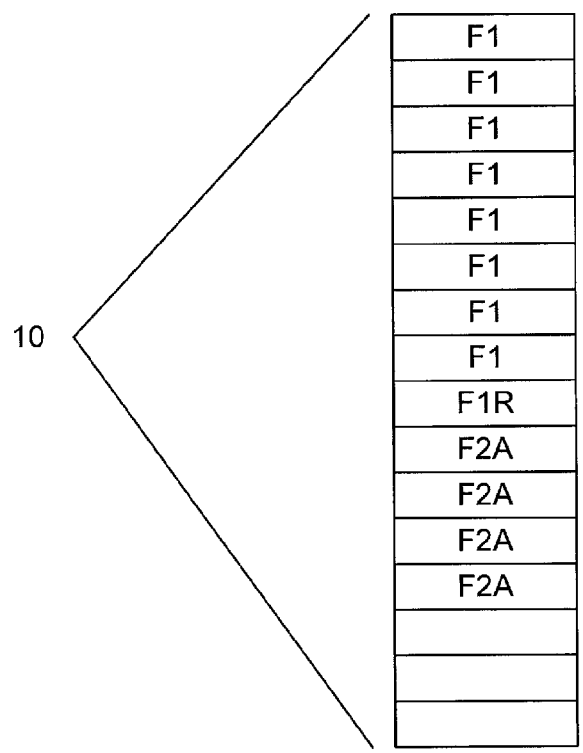
FIG. 1 shows a simplified representation of a memory stack that may be subjected to memory stack attacks by hackers.
Figure 1:
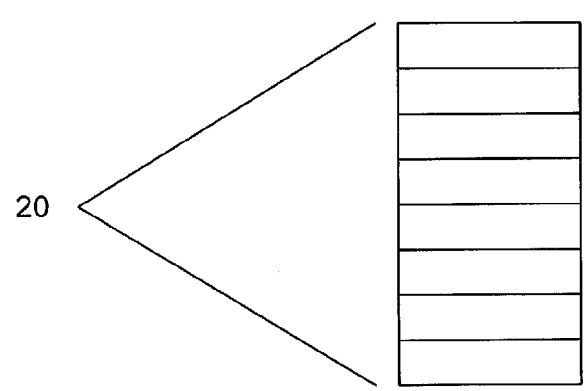

The present invention may be further understood with reference to the following description and the appended drawings, wherein like elements are referred to with the same reference numerals. The exemplary embodiments of the present invention randomize function return addresses on a stack so that the stack image is unique. In a first exemplary embodiment of the present invention, function return addresses are randomized at the time of software installation on a target system to protect against stack overrun attacks. In a second exemplary embodiment of the present invention, function return addresses are dynamically randomized each time the program is executed to protect against the same type of attacks.

Regardless of their complexity, all computer systems have a finite amount of memory. Most modern CPUs, when executing a program (sometimes referred to as a "process"), load static code and data, and then divide remaining free memory between a "stack" and a "heap." Typically, the program stack is at the top of the memory space and expands downward as new items are added to it; the heap is at the bottom of the memory space and grows upward. During program execution, the stack may hold several different items at any given time, e.g., return addresses, local variables and parameters, and "stack frame" pointers. Those skilled in the art will understand that it is possible to implement the stack in a different manner within the memory or to implement a different type of memory management scheme. The present invention may be implemented to protect any type of memory scheme in accordance with the principles described with respect to the exemplary embodiments.

FIG. 1 illustrates a typical memory space 5. Stack 10 is located at the top of the memory space 5 and heap 20 is located at the bottom. (The heap 20 and its uses are not relevant to the present invention; therefore, it will not be discussed further.) Each individual box represents a portion of memory (e.g., a byte). As previously stated, data is initially placed at the top of the stack, and is placed further down as more data is added. For example, when a function "F1" is called, it may require eight (8) bytes of memory to properly operate; those bytes are designated "F1" in the stack 10. If function F1 needs to call a second function F2, it first creates a return address for itself within the stack; this is designated "F1R". F2 then begins its own memory usage directly adjacent to the memory used within the stack by F1. Such operations generally follow a set order. For example, when function F1 calls function F2 in accordance with the following code fragment:

```
F1 ( )
{
  F2 (a, b);
}
F2 (a, b)
{
```

-continued

```
	return;
}
```

The following steps are performed: F1 pushes all parameters onto the stack, first value b, then value a; F1 executes a call to F2, pushing its own return value onto the stack; F2 saves F1's stack frame by pushing it onto the stack; F2 creates its own stack frame by copying the stack pointer to it; F2 reserves space on the stack for its own local variables.

Then, after F2 executes: F2 pops F1's stack frame off the stack; F2 returns to F1 by jumping to the return value found on the stack; F1 removes parameters from the stack (F2 may do this in some implementations). While F2 is being executed, stack memory holds F2's local variables directly adjacent to the stack frame and return address for F1. This is what makes stack-based buffer attacks possible. In IA-32 (x86) opcodes, the exemplary process is:

```
MOV    eax, [n]     ; load value of variable n
PUSH   eax          ; store n on stack
CALL   (F2)         ; call F2 with parameter n
ADD    esp, 4       ; remove n from stack
PUSH   ebp          ; save caller's stack frame
MOV    ebp, esp     ; set new stack frame for this routine
SUB    esp, (###)   ; make room for ### bytes local variables
...    ...          ; perform whatever F2( ) does
MOV    esp, ebp     ; restore stack pointer
POP    ebp          ; restore caller's stack frame
RET                 ; return
```

If F2 uses any string or array variables, it may then become vulnerable to an overrun attack. For example, F2 may define a character array to hold a password F2A of up to 4 characters in length (designated "F2A" in stack 10 of memory space 5 in FIG. 1). If the password input is eight characters, and the application does not explicitly check for this length overflow, the additional four characters will overwrite the previous four bytes on the stack (previous because, while the stack grows downward, string/array copy operations proceed upward). If the array variable F2A is the first one defined by F2, as in the exemplary memory space 5 shown in FIG. 1, it will replace the return address and stack frame F1 with the additional four characters. When F2 finishes executing and the computer returns to F1R, rather than finding the data originally stored when F2 was called, it will find the overflow data from F2A. In situations where this is an accidental overflow, the result would be a memory fault or other program malfunction. If specific values are chosen for the additional bytes, however, an attacker can force a program to execute desired code (e.g., a system call to format a disk, grant administrative rights, etc.).

While the simplest solution would seem to be to check the length of all input received for password F2A from a user (and to check the length of all similar user inputs in the same manner), in complicated modern software "user input" may not originate from a user at all, but from another process. Further, input may pass a length test at one point, but may then be modified by dynamic conditions or be concatenated with other values such that it would not pass a length test at another point. Finally, programmers may simply fail to include such tests altogether, or base a length test on an incorrect length.

It is the storage of function return addresses on the stack that enables stack-based attacks to work. The exemplary methods to be discussed below remedy this vulnerability in a simple and efficient manner, not by removing the return addresses from the stack, but by modifying their value in such as way as to prevent a successful attack. Return addresses pushed onto the stack first have a value subtracted from them, and when they are needed the value is added back to restore the original address. If a single static value were used for every return address, this would provide no protection, as an attacker could then simply examine their copy of the software, adjust their stack attack by the same amount, and continue. The solution to this problem is to locally randomize the value, so that each copy of the software presents a unique image to the attacker. The two exemplary methods to be discussed perform this randomization at different points in time, one during software installation and one during execution, but both have the effect of preventing this type of stack attack.

The first exemplary embodiment includes two separate processes: an installation process and an execution process. In this exemplary embodiment, the randomization is performed when a program is installed. This allows for both the randomization of the program image in memory and its on-disk image. The basis of this randomization is an immediate (static) value that is hard coded within the binary opcodes. FIG. 2 shows the installation method 100 of this exemplary embodiment. The steps of exemplary method 100 may be carried out, for example, by a custom installation program that is distributed with the software to be installed.

In step 105, software is prepared for installation. The software may be any type and may be written to be executed on any type of computing device. The preparation of the software for installation may be any action that needs to be taken by the user and or the device to prepare for the software to be loaded onto the device. The preparation may include, for example, loading a CD-ROM into the computer's disk drive, downloading an installation program from a website, a system administrator pushing a program to a computing device based on a provisioning map for the device, etc.

Those skilled in the art will understand that the software program that is to be installed will be in executable format (i.e., the program has been previously compiled and linked to create the executable file). As part of the linking process, the program may include an offset map that converts disk address to memory locations (e.g., jump addresses). In the distributed executable version of the software program, these correlations will be the same for all distributed copies of the software program. In step 110, the installation program searches the executable file using, for example, the offset map, for occurrences of the jump addresses. In step 115, the install program generates a random number. As will be described in greater detail below, the random number will be used to generate random function return address values that will be placed into the stack to prevent hackers from being able to attack the stack. The random number generated by the install program should be unique for each installation of the software program. For example, if there are a million copies of the software, the installation program should generate a million different random numbers when installing each copy of the software. Even if by some remote chance, the installation program generated a random number that repeated in two or more copies, the hacker would have to have one of those copies of the software and the hacker would have to find the other copies that had the same random number. This is a virtual statistical impossibility.

In step 120, the install program replaces all found instances of the jump addresses in the executable code with the random number generated in step 115. In step 125, the software is installed on the target system and the installation is completed. The installation of the software usually includes saving the software onto a permanent memory device such as a hard disk. Thus, at the end of this installation method, the software is installed on the target system and saved into permanent memory. However, because the installation program generated the random number and substituted this random number for the jump addresses in the binary opcodes of the software, this particular installation of the software is unique from all other installations of the same software. Therefore, if a hacker were to install the exact same distribution of the loaded software onto their computer, the permanent memory image (e.g., hard disk) of the software would be different from image on the target system because the random number generated by the installation program would be different. Thus, the hacker cannot gain insight into the target system by looking at their own hard disk image because it is different.

FIG. 3 shows an execution method 150 for the software that was installed using the installation method 100 of FIG. 2. In step 155, the program is invoked and begins executing on the computing device. Those skilled in the art will understand that there may be many steps and processes that are executed when a program is invoked and the execution method 150 is only describing those steps that are relevant to the exemplary embodiment of the present invention. In step 160, a function call takes place within the program. As described above, when a function is called, a return address for the currently running function may be saved onto the stack 10.

However, as also described above, the installed program includes a random number for the stack return address that has been stored in the binary opcodes of the executing program. Thus, in step 165, the randomized return address is stored on the stack 10. By modifying the function return address in this way, a buffer overrun attack which attempts to overflow the buffer by a specific amount of data so as to force the system to perform desired tasks would need to overflow the buffer by a value dependent on the random number. Because the random number varies with each specific installation of the program, an attacker must write a buffer overflow attack for a specific installation of the program in order for it to be successful. The likelihood of a hacker stumbling across the random number is very small.

In step 170 the called function is performed. After completion of the called function, the program will return to the original function. In order to return to the original function, the processor needs to determine the actual return address. Thus, in step 175, the actual return address is determined. As described above, the installation program will replace the jump addresses with the randomized value. However, during installation, the correlation of the offset map from the randomized address to the actual location is maintained. Thus, the processor can determine the actual address using the offset map that has also been updated with the randomized address. When the actual return address is determined in step 175, the original function may be recalled and executed in step 180. In step 185, it is determined whether another function must be securely called. If so, the method returns to step 160 to perform the steps of the execution method 150 for the newly called function. Those skilled in the art will understand that the step 185 is intended to be a continuous loop until either a function is called and the method 150 needs to be executed or the program is closed by the user.

Thus, in this exemplary embodiment, the randomization of the return addresses is accomplished during program installation. If an attack was launched against the computer (e.g., a stack overrun attack), the worse thing that may happen is that the program would have a memory failure because it could not correlate the overflow information to an actual address. However, the attacker could not gain access to the program because the attacker would not be able to determine the jump address correlations because the random number creates unique correlations for each copy of the program. In addition, because the randomization is stored in the binary opcodes, the system penalty for implementing this exemplary embodiment is generally a very few clock cycles (e.g. 2 clock cycles) per invocation. This is not a very severe overhead penalty to pay when considered against other solutions that require much more system overhead to implement.

FIG. 4 shows a second exemplary method 200 for randomizing return addresses. In this exemplary embodiment, the randomization is performed differently each time the program is invoked. In step 205, the program is invoked and execution begins. In step 210, the program generates a random number to be used for each function call until the program terminates. The random number may be stored in fixed memory location that is accessed each time a function call is made. This will be described in greater detail below. Therefore, in contrast with the first exemplary embodiment, a different random number is generated each time the program is invoked.

In step 215, a function call takes place within the executing program. As described above, when a function is called, a return address for the currently running function may be saved onto the stack 10. However, in this case, prior to storing the return address on the stack, the return address is adjusted by subtracting the random address from the actual address in step 220. Those skilled in the art will understand that while the exemplary embodiment describes that the random number is used to subtract from the actual return address, other functions could be applied to create a randomized return address. In step 225, the randomized return address is stored on the stack 10. In the exemplary opcode that follows this example, the process is shown as pushing the actual address on the stack, popping the actual address, randomizing the address and then pushing the randomized address onto the stack. However, the process could be implemented in other manners and the opcode shown below is only exemplary. The result is that the randomized address is stored on the stack 10, thereby preventing a buffer overrun attack in the same manner as discussed above since the attacker cannot know the actual return address without knowing the random number. Furthermore, the attacker's stack image will be different from the target stack image because of the randomized return address.

In step 230 the called function is performed. After completion of the called function, the program will return to the original function. In order to return to the original function, the processor needs to determine the actual return address. Thus, in step 235, the actual return address is determined by performing the inverse operation of step 220 on the stored randomized return address to generate the actual return address. Again, the random number for this invocation of the program is generated at invocation and is stored until the program is exited. Thus, while executing, the processor has access to the random number and is easily able to perform both the randomization function of step 220 and the inverse function of step 235, as needed.

When the actual return address is determined in step 235, the original function may be recalled and executed in step 240. In step 245, it is determined whether another function must be securely called. If so, the method returns to step 215 to perform the steps of the method 200 for the newly called function. Those skilled in the art will understand that the step 245 is intended to be a continuous loop until either a function is called and the method 200 needs to be executed or the program is closed by the user. Upon closing of the program, the random number that was used for this invocation of the program is automatically deleted because the program will generate a new random number the next time it is invoked.

Function calls according to this exemplary embodiment proceed according to the following exemplary IA-32 pseudocode, wherein "(_rand)" represents the random value generated during invocation of the program:

```
MOV     eax, [n]         ; load value of variable n
PUSH    eax              ; store n on stack
CALL    (F2)             ; call F2 with parameter n
        ;
POP     eax              ; remove return address from stack
SUB     eax, (_rand)     ; adjust by random value
PUSH    eax              ; restore address to stack
        ;
ADD     esp, 4           ; remove n from stack
PUSH    ebp              ; save caller's stack frame
MOV     ebp, esp         ; set new stack frame for this routine
SUB     esp, (###)       ; make room for ### bytes local variables
        ;
...     ...              ; perform whatever F2( ) does
        ;
MOV     esp, ebp         ; restore stack pointer
POP     ebp              ; restore caller's stack frame
        ;
POP     eax              ; remove return address from stack
ADD     eax, (_rand)     ; adjust by random value
PUSH    eax              ; restore address to stack
RET                      ; return
```

Thus, in this exemplary embodiment, the randomization of the return addresses is accomplished during program execution. If an attack was launched against the computer (e.g., a stack overrun attack), the worse thing that may happen is that the program would have a memory failure because it could not correlate the overflow information to an actual address. However, the attacker could not gain access to the program because the attacker would not be able to determine the random number that was used to modify the actual addresses, since that random number is newly generated each time the program is invoked. Again, as with the first exemplary embodiment, the overhead penalty for implementing this exemplary embodiment is very minor. For example, on an I486 architecture, the push/pop pair is 4 clock cycles and the ADD or SUB is another 2 clock cycles. The performance loss based on these values is only negligible.

Those skilled in the art will understand that the above described exemplary embodiment may be implemented in any number of manners, including, for example, as a separate software module, as a combination of software, etc.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method for preventing a buffer overrun attack, comprising:
   receiving a plurality of function return addresses for a program;
   generating a random number used for each function call within the program;
   creating a randomized function return address for each of the function return addresses by identically offsetting each of the function return addresses with only the random number at an installation time of the program; and
   storing the randomized function return addresses in a memory stack;
   wherein the offsetting the function return address comprises prior to storing the randomized function return addresses, subtracting the random number from the function return address;
   determining the function return address by performing an inverse operation on the randomized function return address corresponding to the offsetting;
   storing the random number in a fixed memory location thereby preventing the buffer overrun attack.

2. The method of claim 1, wherein the method is performed each time the program makes a function call.

3. The method of claim 1, further comprising:
   storing the function return address in the memory stack.

4. A method for preventing a buffer overrun attack, comprising:
   searching an executable program file for occurrences of a jump address;
   generating a random number used for each function call in the program;
   identically offsetting each occurrence of jump addresses with only the random number to create randomized jump addresses in a modified executable file at an installation time of the executable program; and
   storing the modified executable program file;
   wherein the offsetting the function return address comprises prior to storing the randomized function return addresses, subtracting the random number from the function return address;
   determining the function return address by performing an inverse operation on the randomized function return address corresponding to the offsetting;
   storing the random number in a fixed memory location thereby preventing the buffer overrun attack.

5. The method of claim 4,
   storing, when a function call is made within the modified executable program file, the corresponding randomized jump addresses in a memory stack.

6. The method of claim 4, wherein the modified executable program file is stored on a hard disk.

7. The method of claim 5, further comprising:
   correlating the randomized jump addresses to the corresponding jump addresses.

8. The method of claim 7, wherein the correlating is performed using an offset map.

9. The method of claim 4, wherein the randomized jump addresses are stored in a binary opcode of the modified executable program file.

10. A system for preventing a buffer overrun attack, comprising:
    a memory including a stack portion; and
    a processor executing program, wherein, when the processor makes a function call within the program, generating a random number used for each function call within the program; the processor stores a plurality of randomized function return addresses in the stack portion of the memory, wherein the processor creates the randomized function return addresses by identically offsetting a plurality of function return addresses only with the random number that is generated when the program is invoked;
    wherein the offsetting the function return address comprises prior to storing the randomized function return addresses, subtracting the random number from the function return address;

determining the function return address by performing an inverse operation on the randomized function return address corresponding to the offsetting;

storing the random number in a fixed memory location thereby preventing the buffer overrun attack.

11. The system of claim 10, wherein the memory is processor memory.

12. The system of claim 10, wherein the randomized function return addresses are stored in the opcodes of the program.

13. The system of claim 10, wherein the processor modifies the function return address by subtracting the random number.

14. A non-transitory computer readable storage medium with an executable program stored thereon, wherein the executable program instructs a processor to perform operations for preventing a buffer overrun attack, comprising:

receiving a plurality of function return addresses for a program;

generating a random number used for each function call within the program;

creating a randomized function return address for each of the return addresses by identically offsetting each of the function return addresses only with the random number at an installation time of the program; and storing the randomized function return addresses in a memory stack;

wherein the offsetting the function return address comprises prior to storing the randomized function return addresses, subtracting the random number from the function return address;

determining the function return address by performing an inverse operation on the randomized function return address corresponding to the offsetting;

storing the random number in a fixed memory location thereby preventing the buffer overrun attack.

\* \* \* \* \*